United States Patent
Tsai

(10) Patent No.: US 6,322,870 B1
(45) Date of Patent: Nov. 27, 2001

(54) SHEET MATERIAL SEALING STRUCTURE FOR INFLATABLE APPARATUS

(76) Inventor: Ching-Hsien Tsai, No. 10, Alley 77, Lane 187. Minchuan Road, Tamshui Taipei (TW)

(*) Notice: Subject to any disclaimer, the term of this patent is extended or adjusted under 35 U.S.C. 154(b) by 0 days.

(21) Appl. No.: 09/349,080

(22) Filed: Jul. 8, 1999

(51) Int. Cl.[7] .......................................................... B32B 3/02
(52) U.S. Cl. ........................ 428/86; 428/35.2; 428/35.4; 428/85; 442/38
(58) Field of Search .............................. 428/86, 85, 35.2, 428/35.4; 442/38

(56) References Cited

PUBLICATIONS

"Goodyear Maintenance Shelter", Jul. 1951, *Rubber Age*, p. 450.*

* cited by examiner

*Primary Examiner*—Blaine Copenheaver
*Assistant Examiner*—Norca L. Torres
(74) *Attorney, Agent, or Firm*—Donald C. Casey, Esq.

(57) ABSTRACT

An inflatable apparatus, which includes an upper cover sheet and a bottom cover sheet respectively cut from a multi-layer sheet material, and at least one connecting band respectively connected between the upper cover sheet and the bottom cover sheet and defining with the upper cover sheet and the bottom cover sheet an air-tight air chamber, each connecting band having a lining cut from same multi-layer sheet material, and a water-proof plastic cover layer covered on the lining over cutting edges of the lining and welded to border areas between the upper cover sheet and the bottom cover sheet, the multi-layer sheet material having two water-proof plastic cover layers, a meshed intermediate nylon layer sandwiched in between the plastic cover layers, and two bonding layers covered on top and bottom sides of the meshed intermediate nylon layer and respectively bonded to the plastic cover layers.

1 Claim, 4 Drawing Sheets

SHEET MATERIAL SEALING STRUCTURE FOR INFLATABLE APPARATUS

BACKGROUND OF THE INVENTION

The present invention relates to inflatable apparatus, and more specifically to such an inflatable apparatus, which provides high tensile strength, and the seams between the upper cover sheet and bottom cover sheet thereof are reinforced against leakage.

Regular inflatable apparatus, such as inflatable boats, beds and sofas, are commonly made by sealing PVC sheets into shape. FIG. 1A shows an inflatable boat of this design. The inflatable boat is comprised of an upper sheet 10 and a bottom sheet 10'. The inner peripheral edge and outer peripheral edge of the upper sheet 10 and the inner peripheral edge and outer peripheral edge of the bottom sheet 10' are respectively sealed together by, for example, a heat sealing apparatus, forming a respective seam R. As illustrated in FIG. 1B, when one peripheral edge of the upper sheet 10 and the corresponding peripheral edge of the bottom sheet 10' are attached together and pressed tight (see arrowheads A), and then welded together. When inflated, components of force are employed to each seam R in reversed directions F (see FIG. 1B). When a sudden compressive pressure is given to the inflatable boat, the seams R tend to be stretched open, causing an air leakage. In order to eliminate this problem, rubber material may be used for making an inflatable apparatus. However, the cost of rubber material is much higher than PVC sheet material. Further, a rubber inflatable apparatus is heavy, and low mobility. Therefore, except for professional use, most consumers do not accept rubber inflatable apparatus.

SUMMARY OF THE INVENTION

The present invention has been accomplished to provide an inflatable apparatus, which eliminates the aforesaid drawbacks. According to one aspect of the present invention, the inflatable apparatus comprises an upper cover sheet and a bottom cover sheet respectively cut from a multi-layer sheet material, and at least one connecting band respectively connected between the upper cover sheet and the bottom cover sheet and defining with the upper cover sheet and the bottom cover sheet an air-tight air chamber, each connecting band having a lining cut from same multi-layer sheet material, and a water-proof plastic cover layer covered on the lining over cutting edges of the lining and welded to border areas between the upper cover sheet and the bottom cover sheet. According to another aspect of the present invention, the multi-layer sheet material comprises two water-proof plastic cover layers, a meshed intermediate nylon layer sandwiched in between the plastic cover layers, and two bonding layers covered on top and bottom sides of the meshed intermediate nylon layer and respectively bonded to the plastic cover layers.

DETAILED DESCRIPTION OF THE PREFERRED EMBODIMENT

Figure 1A:
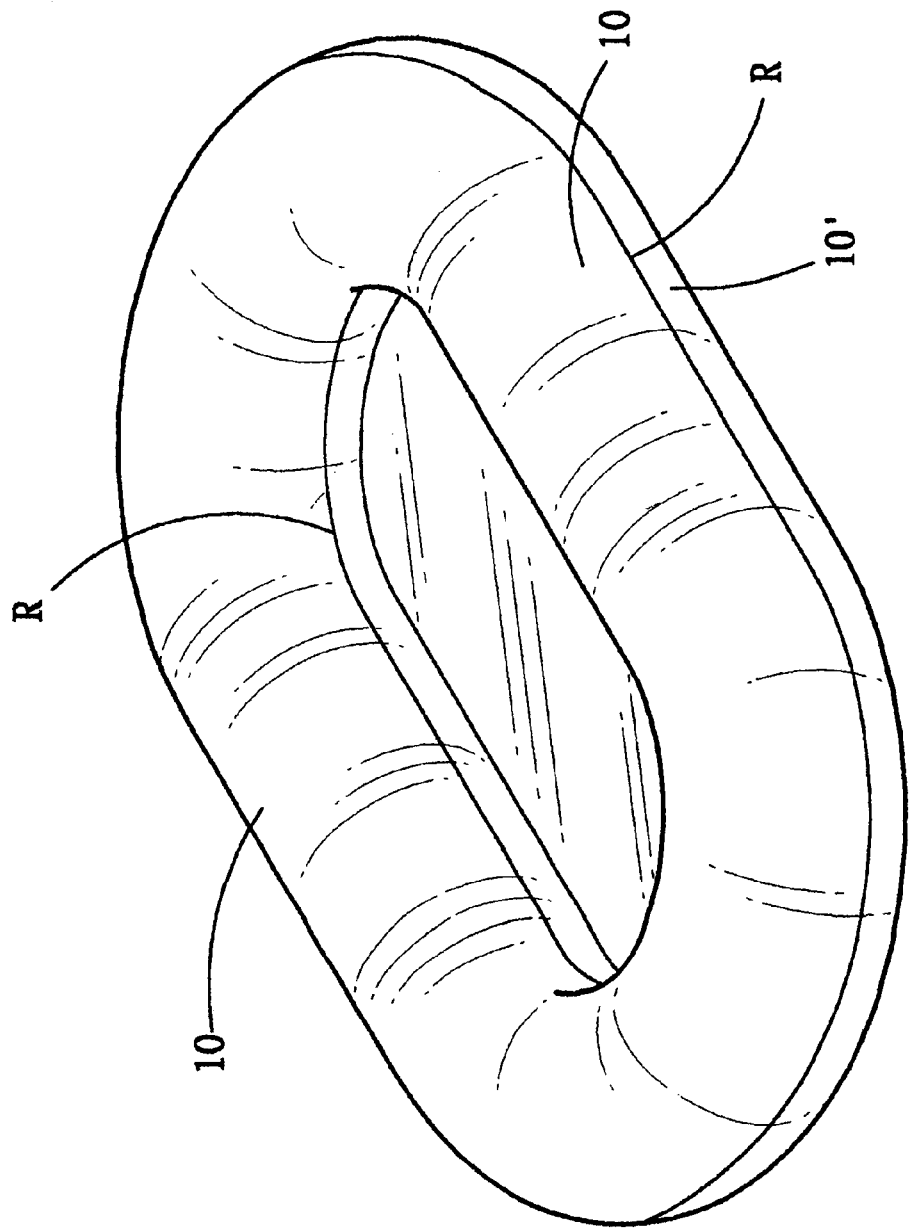
FIG. 1A is an elevational view of an inflatable boat according to the prior art.
Figure 1B:
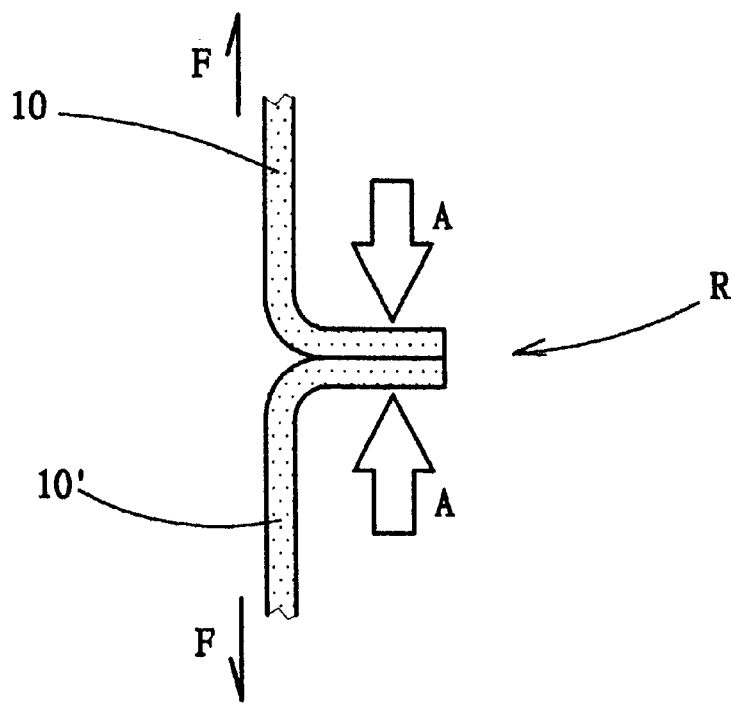
FIG. 1B illustrates the connection between an upper sheet and a bottom sheet sealed together according to the prior art.
Figure 2:
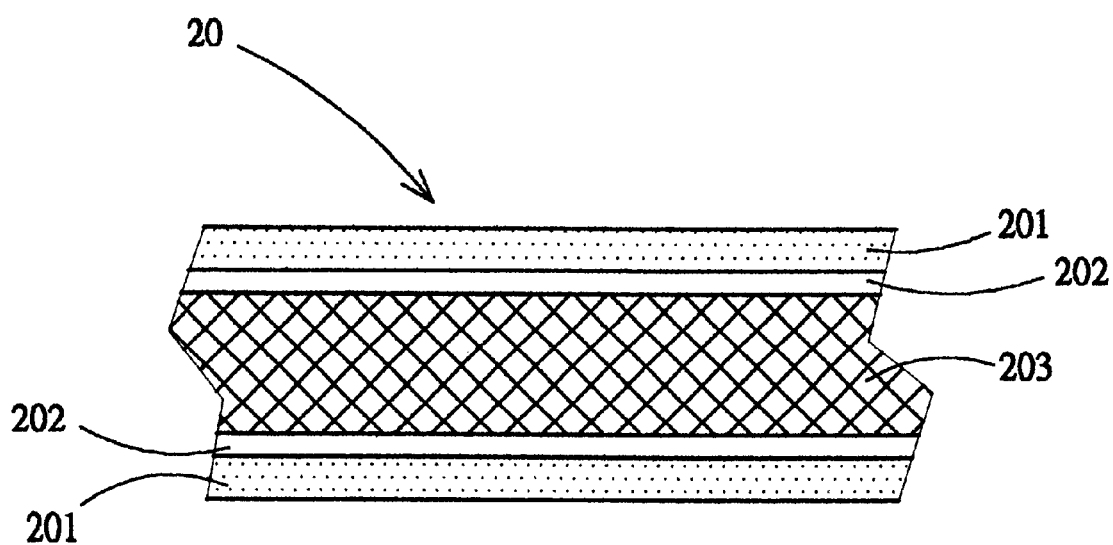
FIG. 2 is a sectional view of a multi-layer sheet material for an inflatable apparatus according to the present invention.

Referring to FIG. 2, a multi-layer sheet material 20 is shown comprised of two water-proof plastic cover layers 201, a meshed intermediate nylon layer 203 sandwiched in between the plastic cover layers 201, and two bonding layers 202 covered on top and bottom sides of the meshed intermediate nylon layer 203 and respectively bonded to the plastic cover layers 201. The plastic cover layers 201 can be obtained from, for example, PVC sheet material for the advantages of high smoothness and high water-proof power. The meshed intermediate nylon layer 203 greatly reinforces the strength of the structure of the multi-layer sheet material 20 and its resiliency. The plastic cover layers 201 provides a soft touch, and a nice looking. When joining two multi-layer sheet materials, they cannot be directly sealed together side to side by a heat sealing apparatus. When two multi-layer sheet materials are welded together side to side, the border edge of the meshed intermediate nylon layer at each multi-layer sheet material is exposed to the outside, i.e., the apparatus made in this manner cannot be maintained in an air tight condition. In order to eliminate this problem, a special joining technique must be employed. This special joining technique is described hereinafter.

Figure 3:
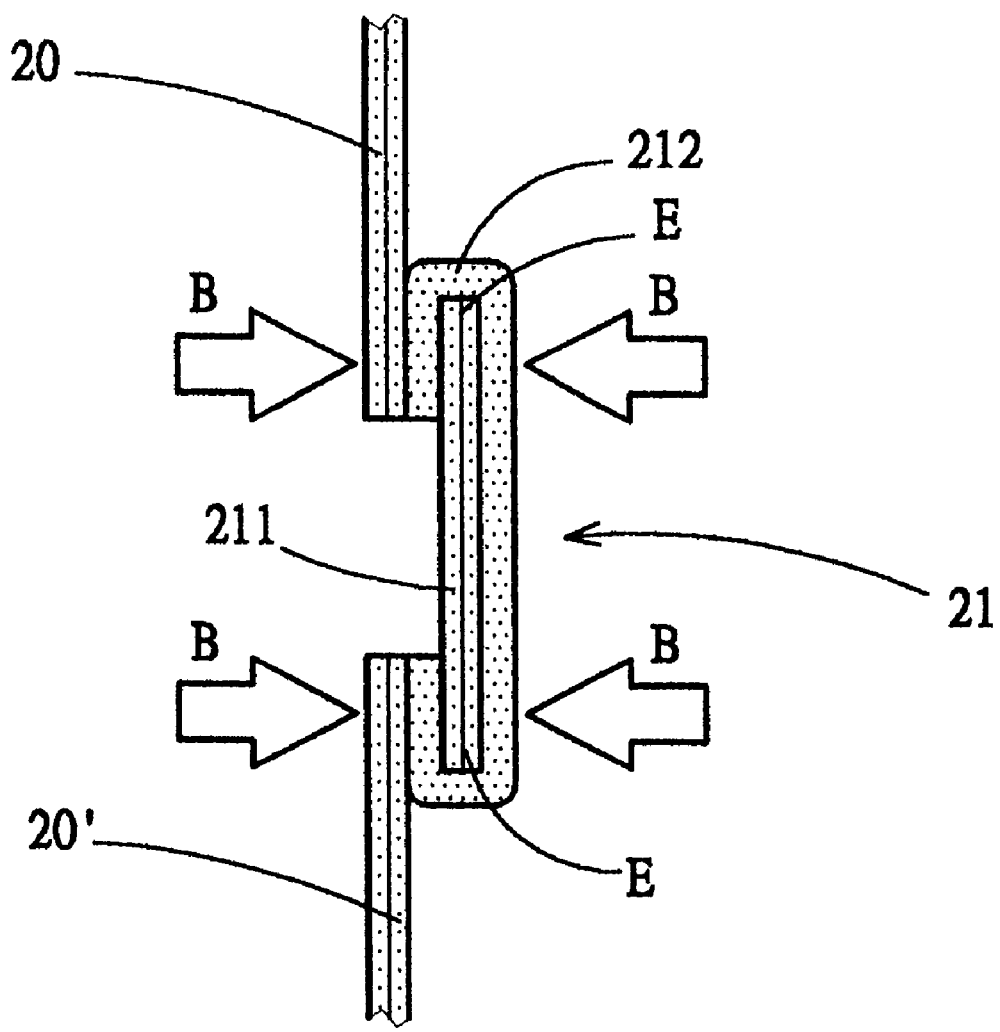
FIG. 3 illustrates the connection between two multilayer sheet materials according to the present invention.

As illustrated in FIG. 3, a connecting band 21 is connected between a first multi-layer sheet material 20 and a second multi-layer sheet material 20'. The connecting band 21 is comprised of a lining 211, and a water-proof plastic cover layer 212 covered on the lining 211 over its cutting edges E and welded to the border areas between the first multi-layer sheet material 20 and the second multi-layer sheet material 20'. The plastic cover layer 212 is preferably obtained from a PVC sheet, and fastened to the multi-layer sheet materials 20 and 20' by a heat sealing apparatus. The lining 211 has same multi-layer structure as the multi-layer sheet materials 20 and 20', and is fastened to the plastic cover layer 212 by a heat sealing apparatus. After the plastic cover layer 212 has been covered on the lining 211, the two opposite ends of the plastic cover layer 212 are respectively retained between the lining 211 and the multi-layer sheet materials 20 and 20', and then the multi-layer sheet materials 20 and 20', the plastic cover layer 212 and the lining 211 are welded together in direction B by a heat sealing apparatus. When welded, the cutting edges E of the lining 211 are sealed to the inside of the plastic cover layer 212.

Figure 4:
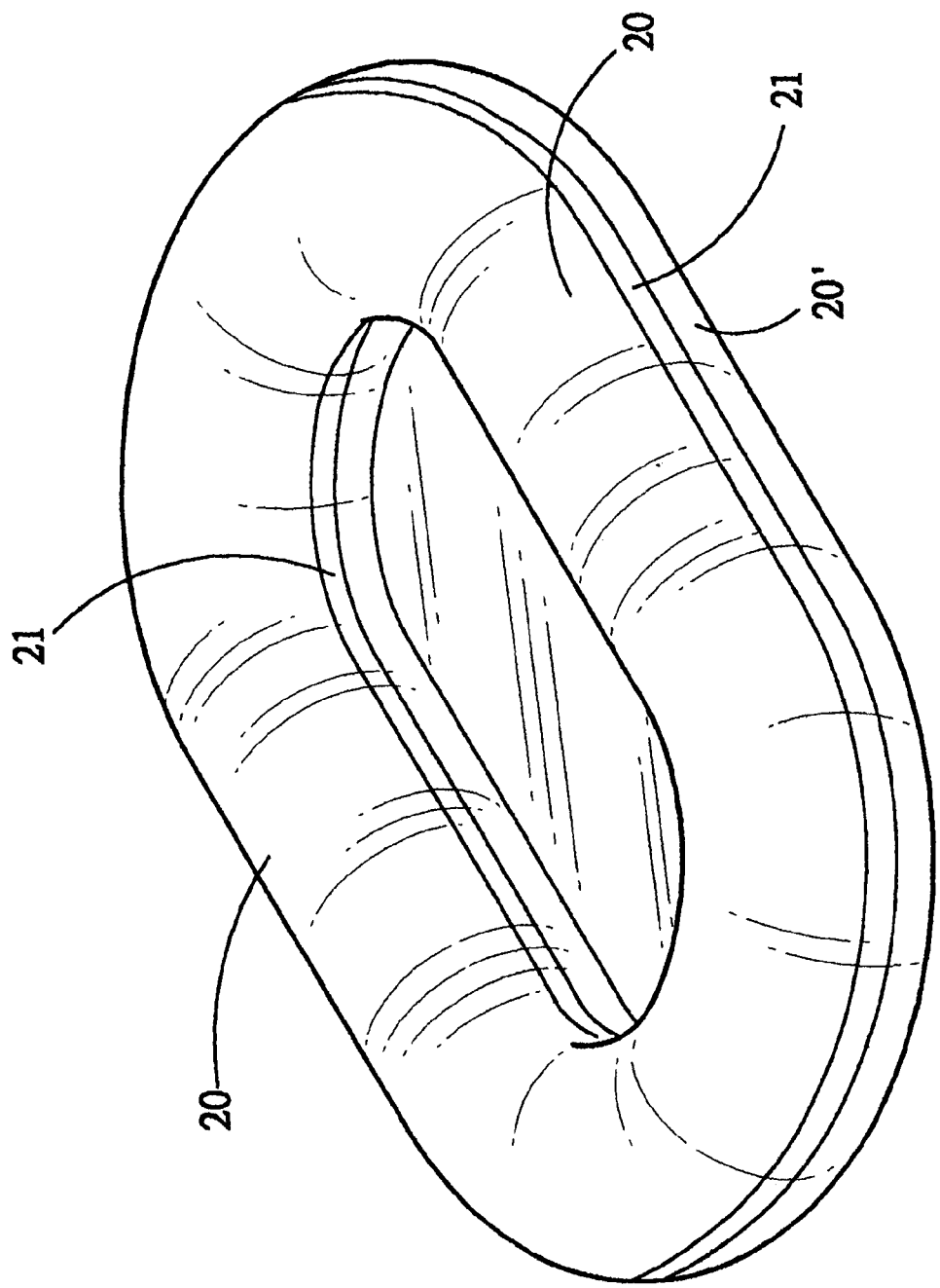
FIG. 4 is an elevational view of an inflatable apparatus according to the present invention.

Referring to FIG. 4, the inflatable boat is comprised of an upper sheet (the aforesaid first multi-layer sheet material) 20, a bottom sheet (the aforesaid second multi-layer sheet material) 20', and two connecting bands 21 respectively connected between the inner peripheral edge and outer peripheral edge of the upper sheet 20 and the inner peripheral edge and outer peripheral edge of the bottom sheet 20'. Because the connecting bands 21 are sealed between the upper sheet (the aforesaid first multi-layer sheet material) 20, a bottom sheet (the aforesaid second multi-layer sheet material) 20', the connecting areas between the upper sheet 20 and the bottom sheet 20' provide high tensile strength, and are maintained in an air-tight condition.

It is to be understood that the drawings are designed for purposes of illustration only, and are not intended as a definition of the limits and scope of the invention disclosed.

What the invention claimed is:

1. An inflatable apparatus comprising an upper cover sheet, a bottom cover sheet, and at least one connecting band respectively connected between said upper cover sheet and said bottom cover sheet and defining with said upper cover sheet and said bottom cover sheet an air-tight air chamber, wherein said upper cover sheet and said bottom cover sheet are respectively cut from a multi-layer sheet material comprised of two water-proof plastic cover layers, a meshed intermediate nylon layer sandwiched in between said plastic cover layers, and two bonding layers covered on top and bottom sides of said meshed intermediate nylon layer and respectively bonded to said plastic cover layers; said at least one connecting band each is comprised of a lining cut from said multi-layer sheet material, and a water-proof plastic cover layer covered on said lining over cutting edges of said lining and welded to border areas between said upper cover sheet and said bottom cover sheet.

* * * * *